United States Patent [19]
Kato

[11] Patent Number: 6,091,033
[45] Date of Patent: Jul. 18, 2000

[54] VEHICLE-MOUNTED KNOB SWITCH DEVICE

[75] Inventor: Hironori Kato, Miyagi-ken, Japan

[73] Assignee: Alps Electric Co., Ltd., Tokyo, Japan

[21] Appl. No.: 09/375,418

[22] Filed: Aug. 17, 1999

[30] Foreign Application Priority Data

Aug. 19, 1998 [JP] Japan .................................. 10-233050

[51] Int. Cl.⁷ .................................................. H01H 9/00
[52] U.S. Cl. ..................................... 200/61.54; 200/61.27
[58] Field of Search ............................... 200/4, 11 R, 14, 200/11 D, 11 DA, 17 R, 18, 61.27, 61.54

[56] References Cited

U.S. PATENT DOCUMENTS

| | | | |
|---|---|---|---|
| 5,003,132 | 3/1991 | Lagier ........................................... | 200/4 |
| 5,629,505 | 5/1997 | Cryer ...................................... | 200/61.54 |
| 5,670,765 | 9/1997 | Yokoyama et al. .................. | 200/61.54 |
| 5,780,794 | 7/1998 | Uchiyama et al. .................. | 200/61.54 |
| 5,923,006 | 7/1999 | Nakamura ................................ | 200/5 B |
| 5,939,686 | 8/1999 | Bellach et al. ........................ | 200/61.54 |
| 5,959,268 | 9/1999 | Hirschfeld ................................ | 200/5 B |

FOREIGN PATENT DOCUMENTS

| | | | |
|---|---|---|---|
| 56-98636 | 8/1981 | Japan ............................... | B60Q 1/02 |

*Primary Examiner*—Michael Friedhofer
*Attorney, Agent, or Firm*—Brinks, Hofer, Gilson & Lione

[57] ABSTRACT

A vehicle-mounted knob switch device having a smaller size and advanced functions is disclosed. The vehicle-mounted knob switch device comprises a stalk, a cover, a holder, a printed wiring board, first and second slider receivers, first and second sliders, a lamp, a screw, a first rotatable control knob, a first cam member, a pin and a spring cooperating to afford a first click feeling, a second rotatable control knob, a second cam member, a top cover, a ball and a spring cooperating to afford a second click feeling, and an indicator window. The first and second rotatable control knobs are directly coupled to each other without any other member interposed between them.

8 Claims, 4 Drawing Sheets

VEHICLE-MOUNTED KNOB SWITCH DEVICE

BACKGROUND OF THE INVENTION

1. Field of the Invention

The present invention relates to a vehicle-mounted knob switch device called, e.g., a stalk switch, and more particularly to a vehicle-mounted knob switch device provided with a plurality of rotatable control knobs.

2. Description of the Related Art

Generally, a vehicle-mounted knob switch device called a stalk switch is installed near a steering column of a vehicle for controlling operations of wipers, headlights, turn signals, and so on.

One example of such a conventional vehicle-mounted knob switch device will be described below by referring to an automotive headlight flashing device disclosed in Japanese Utility Model Application No. 54-181037 (Japanese Unexamined Utility Model Publication No. 56-98636) laid open in the form of a microfilm.

In this example of the vehicle-mounted knob switch device, as shown in FIG. 7, a grip portion 2, an annular control knob 16, a retaining bottom $2_1$ of the grip portion 2, a cylindrical control knob 6, and a retaining plate 9 of the cylindrical control knob 6 are successively attached over an end peripheral surface of a control lever (stalk) 1 in the order named. A push button type control knob 7 is attached to the foremost end of the control lever 1.

In the grip portion 2, a base plate 14, onto which a sensitivity adjusting element 15 is mounted, is fixed in opposed relation to one end face of the annular control knob 16. A slider (not shown) contacting the sensitivity adjusting element 15 is provided on an end face of the base plate 14. Sensitivity of an external illuminance detecting means (not shown) can be adjusted by rotating the annular control knob 16 about the control lever 1 as an axis. A clicking mechanism made up of a ball 17 and a spring 18 is disposed between the other end face of the annular control knob 16 and the retaining bottom $2_1$ of the grip portion 2 so that a click stop feeling is given in the operation of rotating the annular control knob 16.

Further, in a space of the grip portion 2 adjacent the retaining bottom $2_1$, there is fixed a base plate 8 onto which stationary contacts (not shown) of rotary manual flashing switches are mounted, and which is positioned in opposed relation to one end face of a bottom plate of the cylindrical control knob 6. A slider (not shown) contacting the stationary contacts (not shown) is provided on the one end face of the bottom plate. By rotating the cylindrical control knob 6 about the control lever 1 as an axis, on/off control of headlights and sidelights (not shown) can be performed. A clicking mechanism made up of a ball 10 and a spring 11 is disposed between the bottom plate of the cylindrical control knob 6 and the retaining plate 9 so that the cylindrical control knob 6 is clicked in each of operational positions.

The push button type control knob 7 is attached in such a manner as to be able to move back and forth in the longitudinal direction of the control lever 1 for turning on/off a passing switch 5.

Meanwhile, a demand for smaller size and higher functions of such a vehicle-mounted knob switch device has been increased with the increased variety and the advanced functions of electric components mounted in a vehicle.

With the conventional vehicle-mounted knob switch device, however, the following drawbacks are encountered.

Because the cylindrical control knob 6, the annular control knob 16, the base plates 8, 14 respectively cooperating with the control knobs 6, 16, and the grip portion 2 with the retaining bottom $2_1$ and the retaining plate 9 for holding the control knobs 6, 16 are attached over the outer peripheral surface of the control lever 1, an extra space for accommodating other functional parts hardly exist forward-of the position at which the grip portion 2 is fixed to the control lever 1, and a difficulty arises in enhancing functions of the vehicle-mounted knob switch device. Further, because the cylindrical control knob 6 and the annular control knob 16 are arranged through the grip portion 2 with the retaining bottom $2_1$, it is also difficult to reduce the overall length of the vehicle-mounted knob switch device and to downsize the vehicle-mounted knob switch device having advanced functions.

SUMMARY OF THE INVENTION

The present invention has been made with a view of solving the above-described problems in the related art, and its object is to provide a vehicle-mounted knob switch device having a smaller size and advanced functions.

To achieve the above object, according to the present invention, a vehicle-mounted knob switch device comprises a stalk provided near a steering column, a holder fixed to a fore end of the stalk, a cover fixed to the fore end of the stalk and positioned at a rear end of the holder, a top cover attached to a fore end of the holder, a plurality of rotatable control knobs directly coupled to each other without any other member interposed between the control knobs and rotatably held by the holder and/or the cover and the top cover, and a plurality of functional parts arranged in the holder.

With the features that the holder is fixed to the fore end of the stalk and a plurality of functional parts are arranged in the holder, a space for arranging the functional parts therein can be increased in comparison with the case in which the functional parts are arranged over the outer peripheral surface of the stalk, and the functions of the vehicle-mounted knob switch device can be enhanced. Also, with the features that a plurality of rotatable control knobs are directly coupled to each other without any other member interposed between them, and are rotatably held by the holder, the cover and the top cover, a space required for installing the rotatable control knobs can be reduced in comparison with the case in which any other member, e.g., a cover, is interposed between the adjacent rotatable control knobs, and the vehicle-mounted knob switch device can be downsized. As a result, the present invention can provide a vehicle-mounted knob switch device having a smaller size and advanced functions.

DESCRIPTION OF THE PREFERRED EMBODIMENTS

Figure 1:
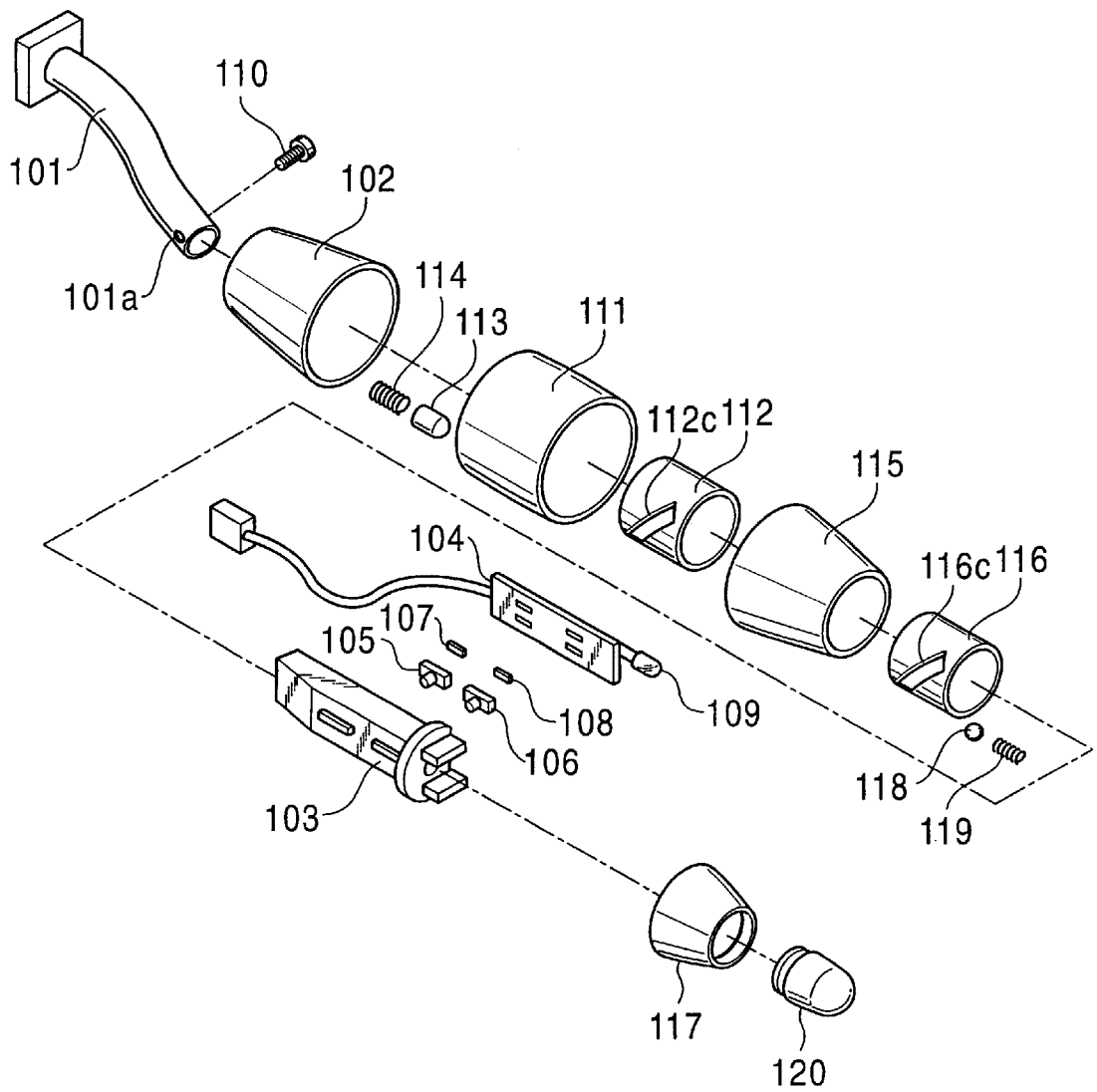
FIG. 1 is an exploded perspective view of a vehicle-mounted knob switch device according to a first embodiment.
Figure 2:
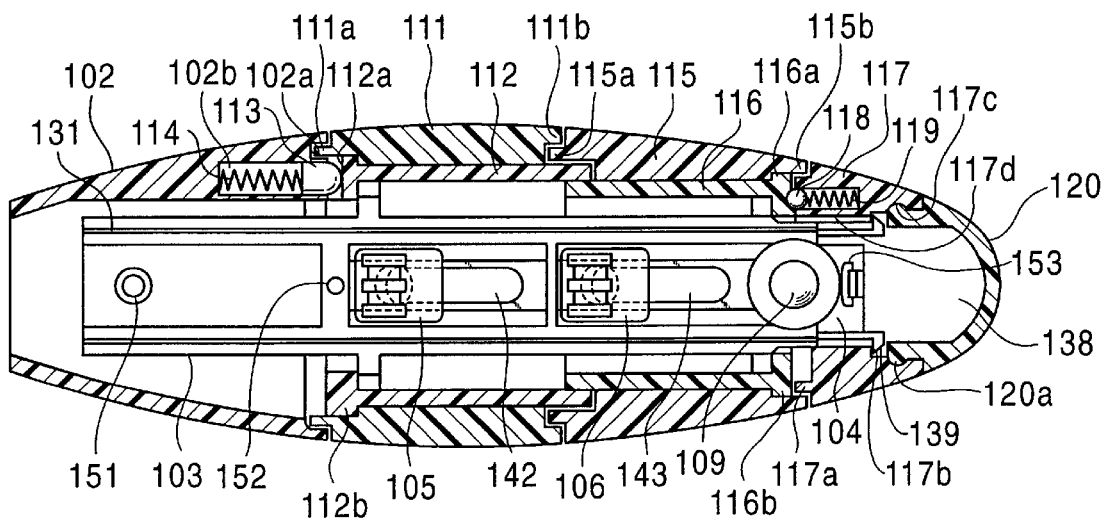
FIG. 2 is a sectional view of the vehicle-mounted knob switch device according to the first embodiment in an assembled state.
Figure 3:
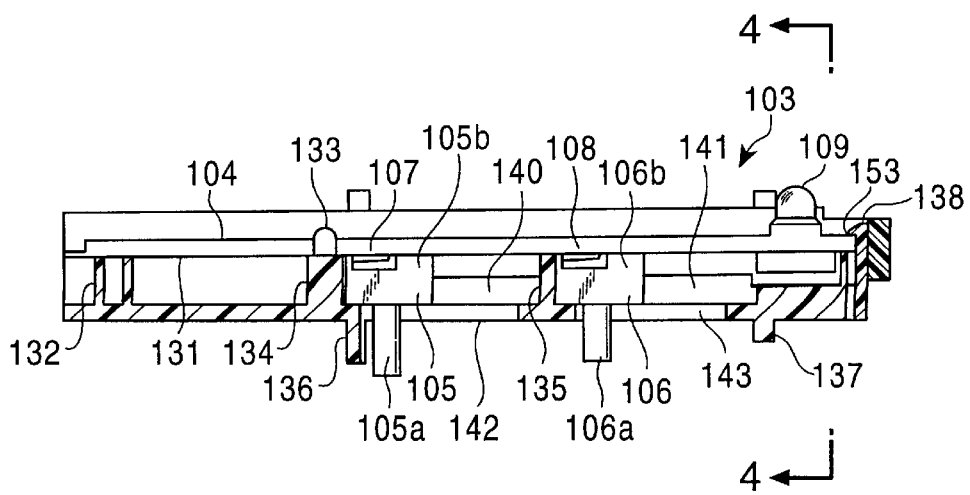
FIG. 3 is a sectional view of a holder, in an assembled state, which is applied to the vehicle-mounted knob switch device according to the first embodiment.
Figure 4:
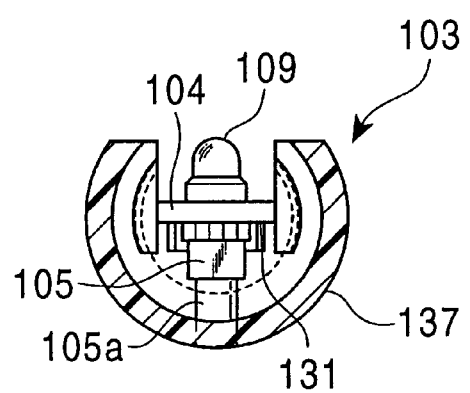
FIG. 4 is a sectional view taken along line 4—4 in FIG. 3.
Figure 5:
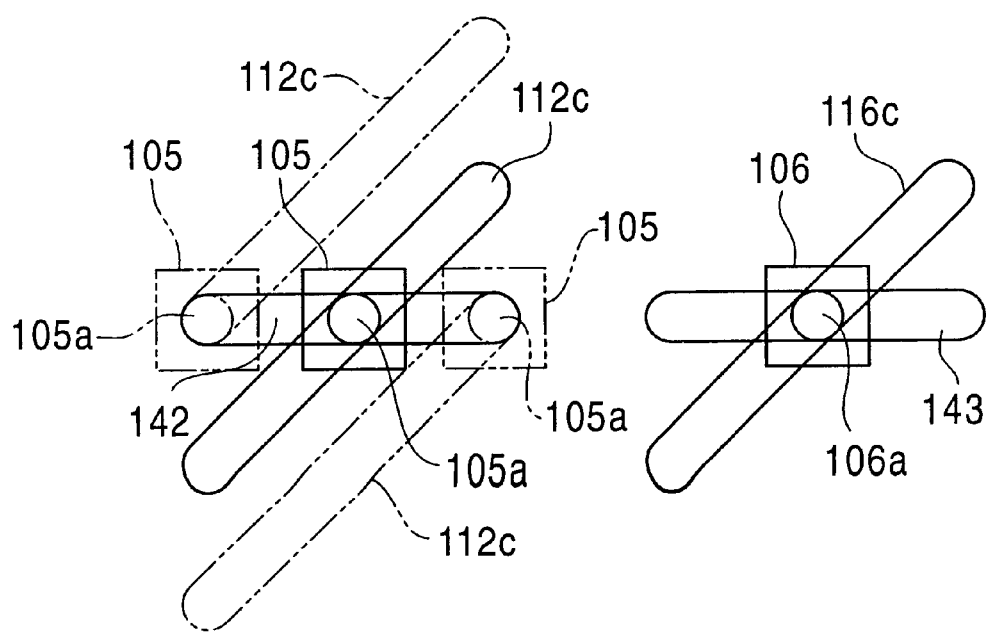
FIG. 5 is a schematic view showing manners of holding and operating slider receivers.

One embodiment of a vehicle-mounted knob switch device according to the present invention will be described below with reference to FIGS. 1 to 5. FIG. 1 is an exploded perspective view of a vehicle-mounted knob switch device according to this embodiment, FIG. 2 is a sectional view of the vehicle-mounted knob switch device according to this embodiment in an assembled state, FIG. 3 is a sectional view of a holder, in an assembled state, which is applied to the vehicle-mounted knob switch device according to this embodiment, FIG. 4 is a sectional view taken along line 4—4 in FIG. 3, and FIG. 5 is a schematic view showing manners of holding and operating slider receivers.

As shown in FIG. 1, the vehicle-mounted knob switch device of this embodiment mainly comprises a stalk 101, a cover 102, a holder 103, a printed wiring board 104, first and second slider receivers 105, 106, first and second sliders 107, 108, a lamp 109, a screw 110, a first rotatable control knob 111, a first cam member 112, a pin 113 and a spring 114 cooperating to constitute a first click-feel affording means, a second rotatable control knob 115, a second cam member 116, a top cover 117, a ball 118 and a spring 119 cooperating to constitute a second click-feel affording means, and an indicator window 120.

The stalk 101 is swingably attached near a steering column (not shown). By swinging the stalk 101 upward or downward from the reference position, turn signals (not shown), for example, which are provided on outer sides of a vehicle body, are selectively driven for illumination. A through hole 101a for penetration of the screw 110 is bored in a fore end portion of the stalk 101, enabling the cover 102 and the holder 103 to be fixedly attached together by the screw 110.

The cover 102 is substantially in the form of a conical cylinder, and an opening at the small-diameter end of the cover 102 is sized so as to allow penetration of the stalk 101 through the opening. A through hole (not shown) for penetration of the screw 110 is bored in a side area of the cover 102 near its small-diameter end, and the cover 102 can be screwed to the fore end portion of the stalk 101. Also, as shown in FIG. 2, an engagement groove 102a for engaging the first rotatable control knob 111 and an accommodation hole 102b for accommodating the pin 113 and the spring 114, which cooperate to constitute the first click-feel affording means, are formed in an end face of the cover 102 on the large-diameter side.

As shown in FIGS. 3 and 4, the holder 103 is substantially in the form of a cylinder having a C-shaped section. Along an inner peripheral surface of the holder 103, a supporting surface 131 for the printed wiring board 104 is formed. In addition, a threaded portion 132 for meshing with the screw 110, a mount portion 134 of a board engaging pin 133, a partition 135 between the first and second slider receivers 105, 106 are successively formed with the same height as the supporting surface 131 for the printed wiring board 104, starting from the side fixed to the stalk 101 in the order named. Further, on an outer peripheral surface of the holder 103, C-shaped ribs 136, 137 are formed in parallel for holding the first and second rotatable control knobs 111, 112 through the first and second cam members 112, 116, respectively. At a fore end of the holder 103, as shown in FIG. 3, a first latch claw 138 for holding the printed wiring board 104 is formed to extend upward, and as shown in FIG. 2, second latch claws 139 for holding the top cover 117 are formed to extend outward perpendicularly to the lengthwise direction of the holder 103. On both sides of the partition 135, accommodation spaces 140, 141 for the slider receivers 105, 106 are formed, and elongate holes 142, 143 are formed in the bottoms of the accommodation spaces 140, 141 so that actuating portions 105a, 106a formed on the slider receivers 105, 106 are allowed to penetrate the elongate holes 142, 143.

The printed wiring board 104 is formed into such a slender shape that it can be mounted on the supporting surface 131 formed in the holder 103. A required wiring pattern (not shown) is formed on the surface of the printed wiring board 104. Also, the printed wiring board 104 has a screw-penetrating through hole 151, a pin engagement hole 152, and a clutch-claw engagement lug 153 which are formed in portions corresponding respectively to the threaded portion 132 for meshing with the screw 110, the mount portion 134 of the board engaging pin 133, and the first latch claw 138, these latter members 132, 134 and 138 being formed in and on the holder 103.

The first slider receiver 105 is made of an insulating material, and comprises an attachment portion 105b for the first slider 107 and the actuating portion 105a vertically extending from the attachment portion 105b. Likewise, the second slider receiver 106 is made of an insulating material, and comprises an attachment portion 106b for the second slider 108 and the actuating portion 106a vertically extending from the attachment portion 106b. The first and second sliders 107, 108 are each made of a conductive material having superior resilience, and are each formed into a required shape corresponding to the wiring pattern formed on the printed wiring board 104.

The first rotatable control knob 111 is in the form of a cylinder having a required width and diameter. The first rotatable control knob 111 has formed at one end thereof a ridge 111a capable of engaging the engagement groove 102a formed in the cover 102, and has formed at the other end thereof an engagement recess 111b for engaging the second rotatable control knob 115.

The first cam member 112 is in the form of a cylinder having such an inner diameter as enabling the first cam member 112 to be rotatably fitted over the rib 136 formed on the outer peripheral surface of the holder 103, and such an outer diameter as enabling the first cam member 112 to be closely fitted to an inner periphery of the first rotatable control knob 111. At one end of the first cam member 112, a flange 112b is provided which has an engagement portion 112a for engaging the pin 113 of the first click-feel affording means. Further, as shown in FIG. 1, the first cam member 112 has an oblique hole 112c bored therein so as to allow penetration of the actuating portion 105a formed on the first slider receiver 105 through the same. The first cam member 112 is closely fitted to the inner periphery of the first rotatable control knob 111 to form an integral structure.

The second rotatable control knob 115 is in the form of a cylinder having a required width and diameter. The second rotatable control knob 115 has formed at one end thereof a ridge 115a capable of engaging the engagement recess 111b formed in the first rotatable control knob 111, and has formed at the other end thereof a ridge 115b capable of engaging an engagement step 117a formed on the top cover 117.

The second cam member 116 is in the form of a cylinder having such an inner diameter as enabling the second cam member 116 to be rotatably fitted over the rib 137 formed on the outer peripheral surface of the holder 103, and such an outer diameter as enabling the second cam member 116 to be closely fitted to an inner periphery of the second rotatable control knob 115. At one end of the second cam member 116, a flange 116b is provided which has an engagement portion 116a for engaging the ball 118 of the second click-feel affording means. Further, as shown in FIG. 1, the second cam member 116 has an oblique hole 116c bored therein so as to allow penetration of the actuating portion 106a formed on the second slider receiver 106 through the same. The second cam member 116 is closely fitted to the inner periphery of the second rotatable control knob 115 to form an integral structure.

The top cover 117 is substantially in the form of a cylinder having a size enough to cover the fore end of the holder 103. In an inner peripheral surface of the top cover 117, there are formed a step 117b for engaging the second latch claws 139 provided at the fore end of the holder 103, and a recess 117c for engaging a latch claw 120a provided on the indicator window 120. Further, in a surface of the top cover 117 facing both the second rotatable control knob 115 and the second cam member 116, there are formed an engagement step 117a for engaging the ridge 115b of second rotatable control knob 115, and an accommodation hole 117d for accommodating the ball 118 and the spring 119 which cooperate to constitute the second click-feel providing means.

The indicator window 120 is in the form of a cap suitable for covering a fore end of the top cover 117. For example, when the first rotatable control knob 111 or the second rotatable control knob 115 is operated, the contents of the functions of the vehicle-mounted electric component switched over upon the knob operation are indicated to the driver by utilizing light from the lamp 109.

A method of assembling the vehicle-mounted knob switch device thus constructed will be described below.

First, as a preparatory step, the first cam member 112 is press-fitted into the first rotatable control knob 111 to form a one-piece unit of both the parts. Also, the second cam member 116 is press-fitted into the second rotatable control knob 115 to form a one-piece unit of both the parts. Then, the spring 114 and the pin 113 cooperating to constitute the first click-feel affording means are put in the accommodation hole 102b of the cover 102 in the order named. Thereafter, the cover 102 and the first rotatable control knob 111 are coupled to each other and tentatively fixed together. Subsequently, the holder 103, the printed wiring board 104, the first and second slider receivers 105, 106, and the first and second sliders 107, 108 are assembled following the steps below. The first slider 107 is fixed to the first slider receiver 105 and the second slider 108 is fixed to the first slider receiver 106, respectively. The slider receivers 105, 106 including the sliders 107, 108 fixed thereto are put in the slider-receiver accommodation spaces 140, 141 formed in the holder 103, and the actuating portions 105a, 106a formed on the first and second slider receivers 105, 106 are inserted through the elongate holes 142, 143 bored in the holder 103, respectively. Then, the latch-claw engagement lug 153 formed on the printed wiring board 104 is engaged with the first latch claw 138 formed on the holder 103, and the board engaging pin 133 formed on the holder 103 is fitted to the pin engagement hole 152 bored in the printed wiring board 104, thereby mounting the printed wiring board 104 onto the substrate supporting surface 131 in the holder 103. Finally, the lamp 109 is electrically connected to predetermined terminals of the printed wiring board 104.

After that, the holder 103 is inserted in the joined unit of the cover 102 and the first rotatable control knob 111, and the actuating portion 105a of the first slider receiver 105, which is projecting outward from the outer peripheral surface of the holder 103, is inserted in the oblique hole 112c of the first cam member 112 press-fitted in the first rotatable control knob 111. With such an arrangement, as shown in FIG. 5, the actuating portion 105a of the first slider receiver 105 is restricted in its position with respect to the printed wiring board 104 under cooperation of the elongate hole 142 bored in the holder 103 and the oblique hole 112c bored in the first cam member 112.

Then, the screw-penetrating through hole 101a bored in the stalk 101, the screw-penetrating through hole (not shown) bored in the cover 102, and the screw-meshing threaded portion 132 formed in the holder 103 are aligned with each other. In this state, the screw 110 is inserted to penetrate the through holes externally of the cover 102 and is tightened into the threaded portion 132, thereby fastening those members into an integral structure. As a result, the first rotatable control knob 111 is rotatably held by the cover 102 and the rib 136 of the holder 103. Accordingly, the cover 102 and the first rotatable control knob 111 can be released from the tentatively fixed state in this stage.

Next, the first rotatable control knob 111 and the second rotatable control knob 115 are coupled to each other. At this time, the actuating portion 106a of the second slider receiver 106, which is projecting outward from the outer peripheral surface of the holder 103, is inserted in the oblique hole 116c of the second cam member 116 press-fitted in the second rotatable control knob 115. With such an arrangement, as shown in FIG. 5, the actuating portion 106a of the second slider receiver 106 is restricted in its position with respect to the printed wiring board 104 under cooperation of the elongate hole 143 bored in the holder 103 and the oblique hole 116c bored in the second cam member 116.

Next, the top cover 117 including the spring 119 and the ball 118, which cooperate to constitute the second click-feel providing means and are put in the accommodation hole 117d in the order named, is engaged with the second latch claws 139 formed on the holder 103, and the ball 118 is pressed against the flange 116b formed on the second cam member 116. As a result, the second rotatable control knob 115 is rotatably held by the first rotatable control knob 111, the rib 137 formed on the holder 103, and the top cover 117.

Finally, the latch claw 120a of the indicator window 120 is engaged in the recess 117c formed in the top cover 117, thereby joining the top cover 117 and the indicator window 120 into an integral structure.

The operation and advantages of the vehicle-mounted knob switch device thus assembled will be described below.

In the vehicle-mounted knob switch device according to this embodiment, since the two rotatable control knobs 111, 115 are directly coupled to each other without any other member interposed between them, when one rotatable control knob is operated for rotation, torque in the same direction of rotation of the one rotatable control knob acts on the other rotatable control knob as well by the frictional force developed between the two rotatable control knobs 111 and 115. However, the two rotatable control knobs 111, 115 are held in place respectively by the pin 113 and the spring 114 which cooperate to constitute the first click-feel affording means, and by the ball 118 and the spring 119 which cooperate to constitute the second click-feel affording means. Accordingly, by setting the resistance developed by the first and second click-feel affording means against rotation to be greater than the frictional force developed between the two rotatable control knobs 111 and 115, the driver can independently operate the two rotatable control knobs 111 and 115 for rotation.

When the first rotatable control knob 111 is operated for rotation, the first cam member 112 is also rotated with the first rotatable control knob 111. As shown in FIG. 5, therefore, an overlapped portion between the elongate hole 142 bored in the holder 103 and the oblique hole 112c bored in the first cam member 112 varies, and the actuating portion 105a of the first slider receiver 105 is moved correspondingly along the elongate hole 142 to the right or left as viewed on the drawing. The movement of the actuating portion 105a changes the resistance value of a sliding type variable resistor, which is made up of the first slider receiver 105, the first slider 107, and a resistance pattern formed on the printed wiring board. It is thus possible to carry out on/off control, speed control and so on of the vehicle-mounted electric components, e.g., front wipers. Likewise, though not shown, when the second rotatable control knob 115 is operated for rotation, the resistance value of a sliding type variable resistor, which is made up of the second slider receiver 106, the second slider 108, and a resistance pattern formed on the printed wiring board is changed correspondingly, thus enabling on/off control, speed control and so on of the vehicle-mounted electric components, e.g., rear wipers. In addition, as the first rotatable control knob 111 or the second rotatable control knob 115 is selectively operated for rotation, the contents of the functions of the vehicle-mounted electric component switched over upon the knob operation are indicated on the indicator window 120 by utilizing light from the lamp 109.

As described above, with the vehicle-mounted knob switch device according to this embodiment, the holder 103 is fixed to the fore end of the stalk 101, and functional parts, such as the sliding type variable resistor and the lamp 109, are arranged in the holder 103. Therefore, a space for arranging the functional parts therein can be increased in comparison with the case in which the functional parts are arranged over the outer peripheral surface of the stalk 101, and the functions of the vehicle-mounted knob switch device can be enhanced. Also, since the two rotatable control knobs 111, 115 are directly coupled to each other without any other member interposed between them and are rotatably held by the cover 102, the holder 103 and the top cover 117, a space required for installing the two rotatable control knobs can be reduced in comparison with the case in which any other member, e.g., a cover, is interposed between the two rotatable control knobs, and the vehicle-mounted knob switch device can be downsized.

While the above embodiment has been described in connection with the case of including two rotatable control knobs, the gist of the present invention is not limited to that case, but also applicable to a vehicle-mounted knob switch device including three or more rotatable control knobs.

Figure 6:
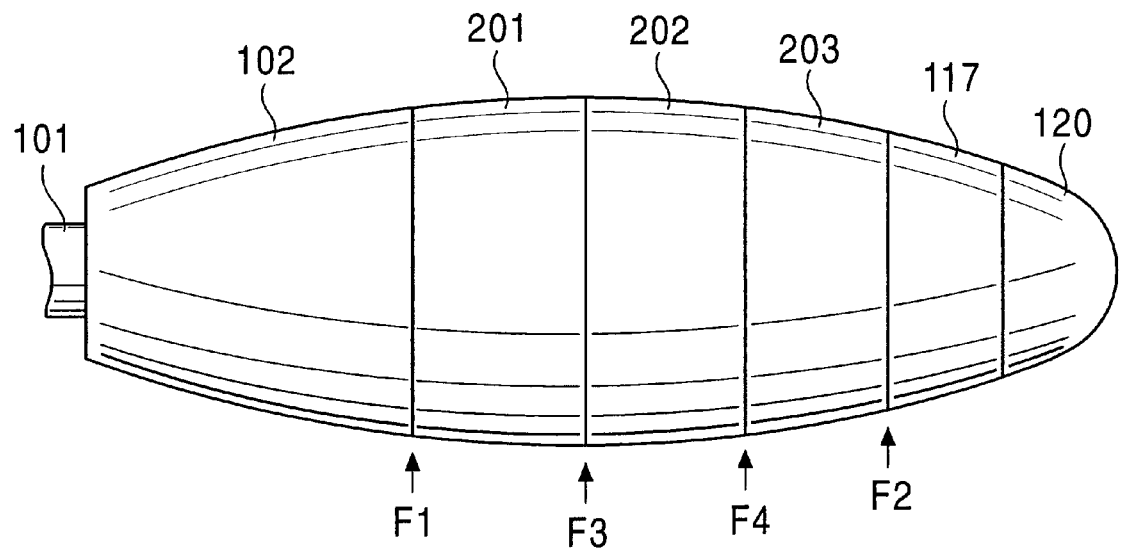
FIG. 6 is a side view of a vehicle-mounted knob switch device according to a second embodiment.
Figure 7:
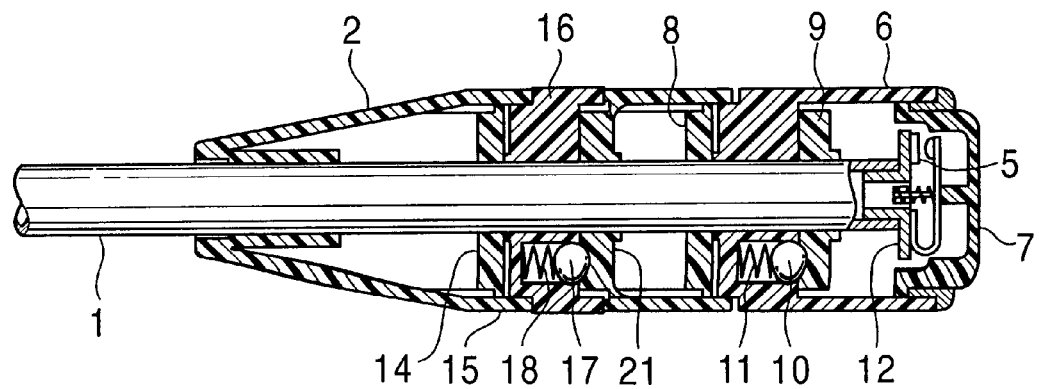
FIG. 7 is a sectional view of a vehicle-mounted knob switch device according to the related art.

FIG. 6 is a side view of a vehicle-mounted knob switch device including three rotatable control knobs 201, 202, 203. First and second click-feel affording means (not shown) are disposed respectively between the cover 102 and the first rotatable control knob 201 and between the top cover 117 and the third rotatable control knob 203. Also, frictional forces are developed between the first rotatable control knob 201 and the second rotatable control knob 202 and between the second rotatable control knob 202 and the third rotatable control knob 203. Assuming that the click force acting between the cover 102 and the first rotatable control knob 201 is F1, the click force acting between the top cover 117 and the third rotatable control knob 203 is F2, the frictional force acting between the first rotatable control knob 201 and the second rotatable control knob 202 is F3, and the frictional force acting between the second rotatable control knob 202 and the third rotatable control knob 203 is F4, the click forces and the frictional forces acting between the respective adjacent members are adjusted so as to satisfy the relationship of F1 (=F2)>F3>F4.

In the vehicle-mounted knob switch device thus constructed, when the first rotatable control knob 201 is operated for rotation, the second rotatable control knob 202 is also rotated with the control knob 201, but the third rotatable control knob 203 is not rotated. On the other hand, when third rotatable control knob 203 is operated for rotation, the first and second rotatable control knobs 210, 202 are both not rotated. Therefore, a high-performance vehicle-mounted knob switch device can be obtained in which an encoder is incorporated as a functional part rotated by the second rotatable control knob 202.

Further, in the case of employing an encoder as a functional part rotated by the second rotatable control knob 202, the vehicle-mounted knob switch device can be modified such that when either of the first and third rotatable control knobs 201, 203 is operated for rotation, the second rotatable control knob 202 is also rotated therewith, by adjusting the click forces and the frictional forces so as to satisfy the relationship of F1 (=F2)>F3 (=F4).

According to the present invention, as described above, a holder is fixed to the fore end of a stalk, and a plurality of functional parts are arranged in the holder. Therefore, a space for arranging the functional parts therein can be increased in comparison with the case in which the functional parts are arranged over the outer peripheral surface of the stalk, and the functions of the vehicle-mounted knob switch device can be enhanced. Also, a plurality of rotatable control knobs are directly coupled to each other without any other member interposed between them, and are rotatably held by the holder, a cover and a top cover, a space required for installing the rotatable control knobs can be reduced in comparison with the case in which any other member, e.g., a cover, is interposed between the adjacent rotatable control knobs, and the vehicle-mounted knob switch device can be downsized. As a result, the present invention can provide a vehicle-mounted knob switch device having a smaller size and advanced functions.

What is claimed is:

1. A vehicle-mounted knob switch device comprising a stalk provided near a steering column, a holder fixed to a fore end of said stalk, a cover fixed to said fore end of said stalk and positioned at a rear end of said holder, a top cover attached to a fore end of said holder, a plurality of independently rotatable control knobs directly coupled and rotatably positioned between said cover and said top cover, said rotatable control knobs being arranged adjacently near an outer peripheral side of said holder, a plurality of functional parts arranged in said holder that correspond to said rotatable control knobs, a plurality of cam members having abutting surfaces near inner peripheral sides of said rotatable control knobs and near said outer peripheral side of said holder, each of said cam members being rotatable with at least one of said rotatable control knobs wherein said rotation actuates a number of said functional parts, two of said cam members positioned near a proximal and a distal end of said switch are resiliently biased by spring means that urge said cam members toward a central position, said spring means produce a resistance that impede the rotation of said cam members positioned near said proximal and said distal ends, and wherein said resistance is greater than a frictional resistance generated by two of said rotatable control knobs that are directly adjacent.

2. A vehicle-mounted knob switch device according to claim 1, wherein said cam members positioned near said proximal and said distal ends are provided with click-feel affording means, respectively, using said spring means.

3. A vehicle-mounted knob switch device according to claim 1, wherein oblique holes engaging actuating portions of said functional parts are formed in said cam members.

4. A vehicle-mounted knob switch device according to claim 1, wherein said plurality of rotatable control knobs are two in number.

5. A vehicle-mounted knob switch device according to claim 4, further comprising two cam members positioned adjacent inner peripheries of said two rotatable control knobs and being rotatable together with said two rotatable control knobs, and said spring means for resiliently urging said two cam members each having an outer lateral surface in directions to come closer to each other, wherein a resistance developed by said spring means against rotation of said respective outer lateral surfaces of said two cam members is set to be greater than a resistance against rotation caused by a frictional resistance at a joint between said two rotatable control knobs.

6. A vehicle-mounted knob switch device according to claim 5, wherein said two cam members are provided with click-feel affording means using said spring means.

7. A vehicle-mounted knob switch device according to claim 5, wherein oblique holes engaging actuating portions of said functional parts are formed in said cam members.

8. A vehicle-mounted knob switch device according to claim 1, wherein said cam members positioned away from said proximal and said distal ends are aligned adjacently such that a resistance against rotation that is generated by a frictional resistance created by abutting surfaces of said rotatable control knobs gradually decreases from a proximal end of said cover to a distal end of said top cover.

* * * * *